Patented Sept. 19, 1939

2,173,440

UNITED STATES PATENT OFFICE 2,173,440

TREATMENT OF RANGE PARALYSIS

Orley J. Mayfield, Charles City, Iowa, assignor to Dr. Salsbury's Laboratories, Charles City, Iowa, a corporation of Iowa No Drawing. Application April 8, 1937, Serial No. 135,815

5 Claims. (Cl. 167—53.1)

My invention relates to the cure and prevention of the diseases known as range paralysis, neurolymphamatosis and leukemia in chickens, and comprises a method of treatment and a new preparation for use in treating such diseases.

I have found that these diseases or conditions which manifest themselves by (1) tumors involving the internal organs such as the liver, spleen, heart, kidneys, muscles and eyes, (2) tunifications or enlargement of the peripheral nerves such as the optic, vagus, brachial and sciatic, (3) disturbances of the blood cells, including excess or lack of both red and white blood cells, and any combinations of these conditions, are due to a hyper-sensitiveness to moulds or fungi such as Monilia albicans, Monilia krusei, Oidum pullorum and similar organisms.

I have found that these various species of yeast-like fungi when grown on various media, either natural or synthetic and injected, preferably after sufficient sterilizing to prevent further growth, either intro-dermally or subcutaneously will cause those individuals having this hyper-sensitiveness which sometimes manifests itself by causing range paralysis, neurolymphamatosis or leukemia to recover from this condition and furthermore that these substances when injected in a similar manner into individuals not having this condition will prevent this individual from contracting such disease.

For example, in July, 1935, I examined a white leghorn rooster, approximately four weeks of age, which was paralyzed in one leg and left wing. The left wing nerve was visibly enlarged. This bird also showed a scaly condition of the skin. A culture was taken from the skin of this bird and yeast-like fungi was obtained. This growth was inoculated into a tube of broth media and incubated for three days at 37° C. This broth was then sterilized by heating in the autoclave at 15 lbs. of steam pressure for thirty minutes. After this material was allowed to cool, it was shaken thoroughly and ½ cc. of this material was injected intradermally into the wattle of the bird. On the following day this bird showed a marked edematous swelling of the wattle in which the material was injected. This swelling remained for three days, at which time the bird was able to walk normally. This bird was held under observation for three months, during which time the left wing nerve returned to its normal size. The scale material peeled off over the entire surface of the body and the skin regained its normal texture. Upon a post morten examination, this bird showed no lesions of paralysis. This experiment would indicate that this range paralysis which was present in this bird was due to a hyper-sensitiveness to a yeast-like fungus and that the injection of a material of this kind, would cause these birds to recover from this hyper-sensitiveness.

A second example has to do with a flock of 456 white leghorn pullets, eight months of age, in the vicinity of Charles City, Iowa. On November 6, 7 and 8, 1935, birds from this flock had succumbed to range paralysis, a condition which manifests itself by enlargement of the brachial and sciatic nerve. On November 9, 1935, the entire flock of 456 birds was given intradermal injections in the wattle of ¼ cc. of a broth culture of Monilia krusei which had been previously killed by subjecting the culture to fifteen pounds steam pressure for ¼ hour. On November 10, 1935, the entire flock of 456 birds was examined and 112 of these birds were removed from this flock and placed in a separate pen. All of these 112 birds showed an edematous swelling in the region of the wattle in which this material was injected, indicating that these birds had a hyper-sensitiveness to Monilia krusei. On November 13, one of the 112 birds succumbed to range paralysis as indicated by enlargement of the sciatic nerve. Up to August 1, 1936, no additional birds in this flock succumbed to range paralysis, proving that this injection was sufficient to immunize these birds against this disease.

A third example has to do with three flocks owned in the vicinity of Fremont, Ohio, totalling approximately 3,000 birds. During the past year, all of these flocks had lost large numbers of birds due to range paralysis. These 3,000 birds were vaccinated during the month of August, 1936, when the birds were approximately sixteen weeks of age, by injecting ½ cc. of a broth culture consisting of equal parts of a broth culture of Monilia albican and Monilia krusei which had been killed by the addition of 1% formaldehyde. This material was injected intra-dermally into the wattle of each bird. Up until March 8, 1937, none of these 3,000 birds have shown any indication of range paralysis. This indicates to me that this material when administered intra-dermally in doses of ½ cc. in birds sixteen weeks of age will prevent range paralysis in the birds for seven months.

A fourth example has to do with four birds received on November 6, 1936, from the vicinity of Massillon, Ohio, from a flock that had been suffering from range paralysis. These birds were all killed. Manifest range paralysis as shown by enlargement of the brachia and sciatic nerves and tumors. Yeast-like cultures apparently *Monilia krusei* were obtained from mycotic lesions in the intestinal tract of three of these birds. A culture of *Aspirgillus fumigatus* was also obtained from the air sac of one bird. A vaccine was prepared from this yeast-like fungi by growing this organism in veal broths containing 1% glucose. This organism was grown for seven days in this broth at thirty degrees centigrade. This broth was then filtered through filter paper and one percent formalin added to the filtrate. Thereupon the flock from which these birds came was vaccinated by the injection of ¼ cc. of this filtrate intra-dermally. On November 27, 1936, within a few days following vaccination, the owner was able to note a marked improvement in the appearance of the flock and all cases paralysis stopped and this was followed by a noticeable pick-up in egg production.

Thus it will be seen from the previous examples that I have used successfully killed broth culture and filtrates of killed broth cultures, either singly or collectively, intra-dermally for preventing and treating of range paralysis, or leukemia in birds. I have also used singly and collectively cultures of *Monilia albicans*, *Monilia candida* and *Monilia krusei* and *Oidium pullorum* injected either subcutaneously or intra-dermally for paralysis. I have found that extracts of growths of these organisms and their metabolic by-products will accomplish the same results.

I claim:

1. An immunizing vaccine for leukemia or range paralysis in poultry, comprising a product made by growing on synthetic media and sterilizing yeast-like fungi of the class consisting of *Oidium pullorum*, *Monilia albicans*, *Monilia candida* and *Monilia krusei*, said vaccine being adapted to be administered either intra-dermally or subcutaneously to poultry subject to range paralysis or leukemia to immunize the individuals so treated from said diseases.

2. An immunizing vaccine for leukemia or range paralysis in poultry comprising a product made by growing on synthetic media and sterilizing yeast-like fungi *Oidium pullorum*, said vaccine being adapted to be administered either intra-dermally or subcutaneously to poultry subject to range paralysis or leukemia to immunize the individuals so treated from said diseases.

3. An immunizing vaccine for leukemia or range paralysis in poultry comprising a product made by growing on synthetic media and sterilizing yeast-like fungi *Monilia albicans*, said vaccine being adapted to be administered either intra-dermally or subcutaneously to poultry subject to range paralysis or leukemia to immunize the individuals so treated from said diseases.

4. An immunizing vaccine for leukemia or range paralysis in poultry comprising a product made by growing on synthetic media and sterilizing yeast-like fungi *Monilia krusei*, said vaccine being adapted to be administered either intra-dermally or subcutaneously to poultry subject to range paralysis or leukemia to immunize the individuals so treated from said diseases.

5. An immunizing vaccine for use in the treatment of range paralysis or leukemia in poultry prepared from cultures taken from affected parts of poultry or birds afflicted with range paralysis or leukemia and sterilized after a period of growth sufficient to establish the property of immunizing individuals from said diseases.

ORLEY J. MAYFIELD.